April 24, 1951  E. R. JOYNES  2,549,909
AUTOMATIC TIME VALVE
Filed Aug. 13, 1948  2 Sheets-Sheet 1

INVENTOR.
ERNEST R. JOYNES
BY
McMorrow, Berman + Davidson
ATTORNEYS

April 24, 1951 E. R. JOYNES 2,549,909
AUTOMATIC TIME VALVE
Filed Aug. 13, 1948 2 Sheets-Sheet 2
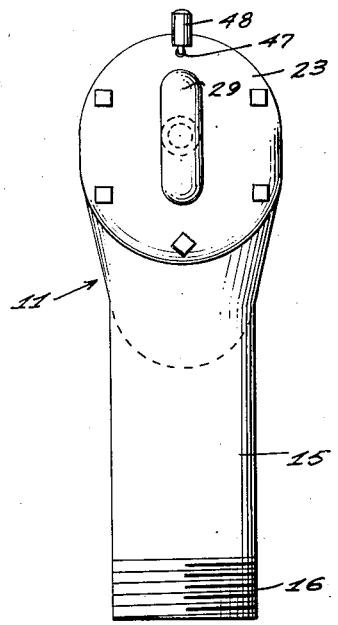
Fig. 3
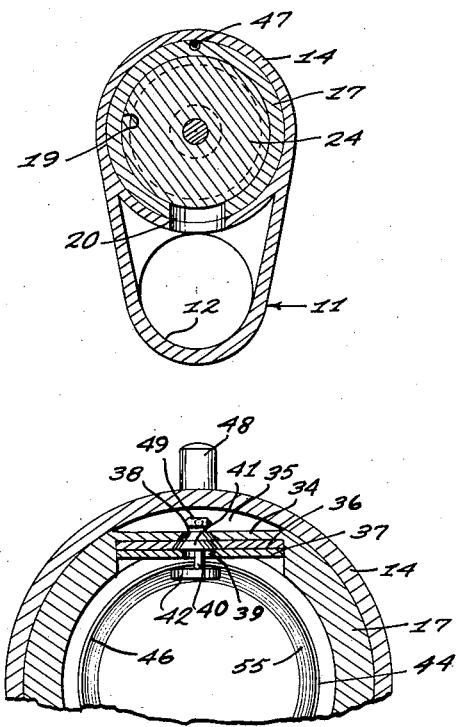
Fig. 4
Fig. 5
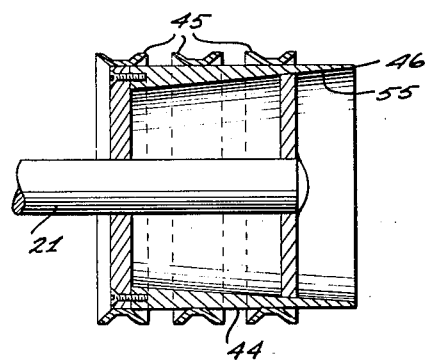
Fig. 8
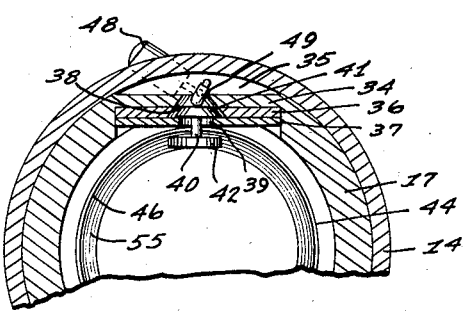
Fig. 6
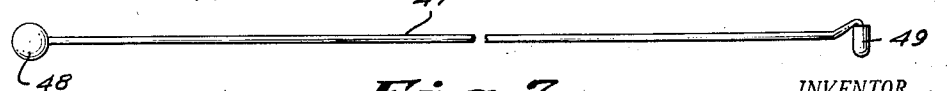
Fig. 7
INVENTOR.
ERNEST R. JOYNES
BY
McMorrow, Berman + Davidson
ATTORNEYS Patented Apr. 24, 1951

2,549,909

UNITED STATES PATENT OFFICE 2,549,909

AUTOMATIC TIME VALVE

Ernest R. Joynes, Oakland, Calif.

Application August 13, 1948, Serial No. 44,047

4 Claims. (Cl. 251—138)

This invention relates to valve devices, and more particularly to a manually settable automatic timing valve for use to regulate the flow of any free flowing liquid.

A main object of the invention is to provide a novel and improved timing valve of the manually settable type which is simple in construction, easy to manipulate and reliable in performance.

A further object of the invention is to provide an improved timing valve which may be set to provide free flow of liquid therethrough for a predetermined period of time and which will automatically close to terminate the flow at the end of said period, provision being made for manually tripping the release mechanism of the valve to close same prior to the end of said period if so desired, said valve being inexpensive to manufacture, rugged in construction, and simple to adjust.

Further objects and advantages of the invention will become apparent from the following description and claims, and from the accompanying drawings, wherein:

Figure 3 is a rear end elevational view of the valve of Figure 1.

Figure 4 is a cross-sectional view taken on line 4—4 of Figure 1.

Figure 5 is an enlarged fragmentary cross-sectional view taken on line 5—5 of Figure 1, but showing the automatic trip cup in engagement with the trip plug head to open the valve release port.

Figure 6 is a view similar to Figure 5 but showing the manual trip member in engagement with the trip lug to open the valve release port.

Figure 7 is an elevational detail view of the manual trip member employed in the valve of Figure 1.

Figure 8 is an enlarged cross-sectional detail view taken on line 8—8 of Figure 2.

Figure 1:
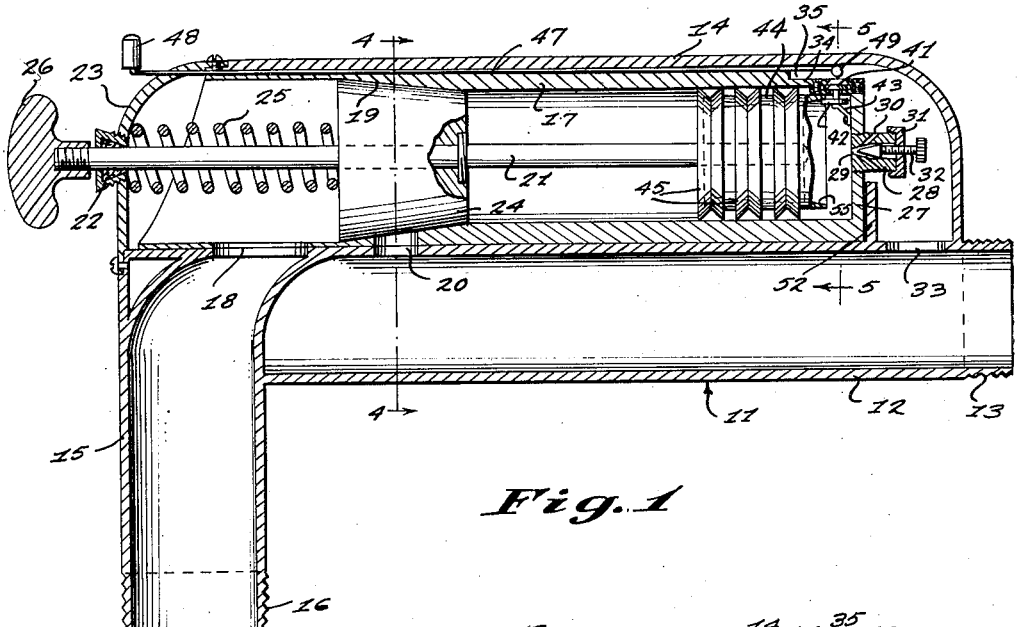
Figure 1 is a longitudinal cross-sectional view taken through a timing valve constructed in accordance with the present invention, the valve being shown in closed position.

Referring to the drawings, 11 designates the main body of the valve, said main body comprising an inlet conduit 12 having a threaded end 13 adapted to be connected to the liquid supply pipe. Integral with inlet conduit 12 is a valve housing 14 which terminates in a right-angled outlet conduit 15, said outlet conduit having a threaded end 16 adapted to be connected to a liquid discharge device, such as a water sprinkler or the like. Positioned in valve housing 14 is a sleeve 17. At its rearward end sleeve 17 communicates with outlet conduit 15 through an opening 18. Sleeve 17 is formed at its rear portion with a conical seat 19. Seat 19 communicates with inlet conduit 12 through an opening 20. Designated at 21 is a rod member extending axially through valve housing 14 and passing slidably through a gland 22 carried on a detachable end wall member 23 secured to the valve housing.

Secured to rod member 21 is a conical plug 24 which is biased toward seating engagement on seat 19 by a coiled spring 25 encircling the rear portion of rod member 21 and bearing between plug 24 and end wall member 23. Secured to the outer end of rod member 21 is a handle 26 which is employed to retract the plug 24 to open position against the pressure of spring 25.

Sleeve 17 is formed with a forward end wall 27 and secured therein is a plug element 28 formed with an axial orifice 29 and lateral passages 30 connecting orifice 29 to the outside sleeve member 17. Plug element 28 has secured thereto an end cap 31 through which is axially threaded the shank of a needle valve 32 whose tip projects into the orifice 29 and which may be adjusted to provide a desired rate of flow through the orifice 29. The forward end portion of valve housing 14 communicates with inlet conduit 12 through an opening 33.

The forward upper portion of sleeve member 17 is reduced in thickness at 34 to define a recess 35. Secured beneath reduced portion 34 are flat strips 36 and 37. Portion 34 and strip 36 are formed with a downwardly flaring conical valve seat 38 and strip 37 is formed subadjacent said seat with a port 39. Designated at 40 is a vertically movable valve element having its shank located substantially axially in port 39. Valve element 40 has a conical top plug 41 adapted to sealingly engage seat 38 and has at its bottom end a disc element 42. Secured to end wall 27 below disc element 42 is a rigid support bracket 43 which limits downward movement of disc element 42.

Secured to the forward end of rod member 21 is a cup member 44 having secured to its outer periphery a plurality of spaced resilient sealing rings 45 slidable within but sealingly engaging the inner bore of sleeve member 17. As shown in Figure 8, cup member 44 has a tapered bore and presents at its open end the forwardly flaring bore portion 55 and the thin annular edge 46. When valve element 40 is in closed position, as shown in Figure 2, and cup member 44 is moved forwardly to the position of Figure 1, the edge 46 engages above disc element 42 and the flaring bore portion 55 exerts a downward thrust on said disc element, causing plug 41 to become unseated.

Extending slidably through the upper portion of housing 11 and slidably positioned in a longitudinal groove formed in sleeve 17 is a longitudinal rod member 47 terminating at its outer end in a right-angled knob 48 and at its inner end in a right-angled arm 49 located in recess 35 above plug 41. By rotating knob 48, plug 41 may be depressed to an unseated position.

Figure 2:
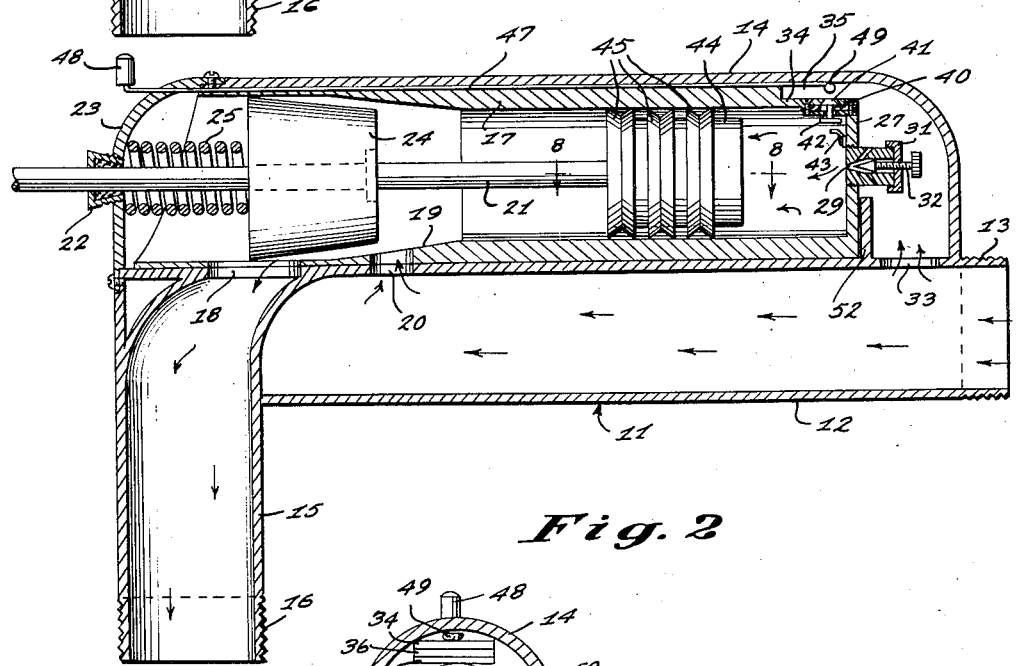
Figure 2 is a cross-sectional view similar to Figure 1 but showing the valve in open position.

The valve is normally in its closed position, shown in Figure 1. The valve is opened by retracting rod 21 by means of handle 26. On the rearward stroke of cup 44, suction is created behind the cup and liquid flows upwardly through opening 33, around the end wall of sleeve 17, and through unseated plug 41, flowing downwardly into the space behind cup 44 through port 39, the bracket 43 supporting disc element 42 to prevent plug 41 from closing off port 39. The space behind cup 44 becomes filled with liquid. At the same time liquid flows freely from inlet conduit 12 through opening 20, around seat 19, and through opening 18 into the outlet conduit 15. Spring 25 is in a compressed condition, as shown in Figure 2, and when handle 26 is released exerts return pressure on plug 24. This return pressure is transmitted through the sealing rings 45 and cup 44 to the liquid in the space behind cup 44, moving plug 41 upwardly to seated position and forcing said liquid to be expelled from said space through orifice 29 past needle valve 32. After a period of time, determined by the setting of said needle valve, the tapered annular forward end of cup 44 engages over disc 42 and unseats plug 41, as above described, releasing the remaining liquid in said space and removing all remaining resistance to expansion of spring 25. Plug 24 then seats on conical seat 19, terminating the flow of liquid through the valve.

Should it be desired to close the valve during its timed operation, it is merely necessary to rotate knob 48, as above described, whereby arm 49 unseats plug 41 and releases the liquid in the space behind cup 44.

Figure 9:
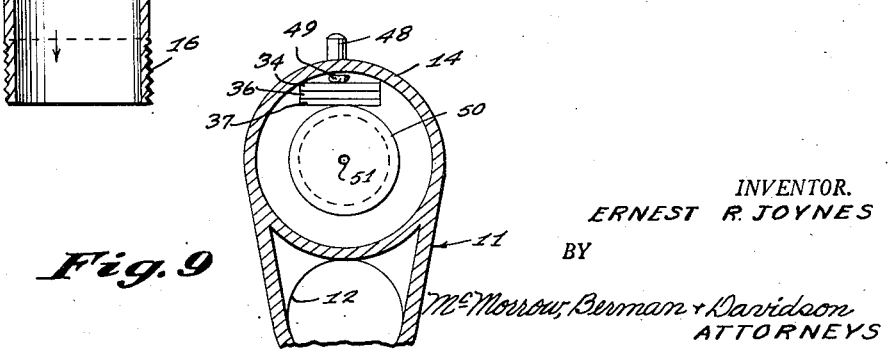
Figure 9 is a fragmentary vertical transverse cross-sectional detail view taken through the rear portion of the valve looking toward the timing orifice but showing a modified form of timing orifice member.

Instead of employing the adjustable needle valve 32, shown in Figures 1 and 2, the plug element 28 may be replaced by an apertured disc 50, as shown in Figure 9, the orifice thereof being shown at 51 and being dimensioned to provide a desired predetermined timing period for the valve. Different timing periods may be provided by employing discs 50 having different sizes of timing orifices 51.

The sleeve 17 is made with a telescoping sliding fit within valve housing 14 so that by removing end wall member 23 said sleeve may be withdrawn to adjust the timing period of the valve. An upstanding abutment 52 secured in housing 11 limits forward sliding movement of sleeve 17 in the valve housing 14.

While certain specific embodiments of a liquid timing valve have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In an automatic liquid timing valve of the type comprising a housing, a sleeve member in said housing having a forward end wall, said sleeve member being formed with a valve seat at its rear portion, a plunger rod extending axially in said sleeve member and projecting externally of the housing, a plug element carried by said plunger rod engageable with said valve seat, and spring means biasing said plunger rod toward valve-seating position the improvement comprising, an inlet conduit communicating with said valve seat, an outlet conduit communicating with the space rearwardly adjacent said seat, a cup member carried on the plunger rod adjacent the forward end wall of and slidably fitting within the sleeve member, said end wall having a restricted orifice therein, a suction-responsive check valve provided in said sleeve member adjacent said end wall, and conduit means connecting said inlet conduit to the space adjacent said check valve.

2. In an automatic liquid timing valve of the type comprising a housing, a sleeve member in said housing having a forward end wall, said sleeve member being formed at its rear portion with a valve seat, a plunger rod extending axially in said sleeve member and projecting externally of the housing, a plug element carried by said plunger rod engageable with said valve seat, and spring means biasing said plunger rod toward valve-seating position, the improvement comprising an inlet conduit communicating with said valve seat, an outlet conduit communicating with the space rearwardly adjacent said seat, a cup member secured to said rod and being slidable within and sealingly engaging within said sleeve member, said cup member being located adjacent said forward end wall, said end wall having a restricted orifice therein, a suction-responsive check valve provided in said sleeve member forwardly of the cup member, conduit means connecting said inlet conduit to the space adjacent said check valve, and cooperating means on said cup member and check valve for opening said check valve responsive to movement of said cup member toward said end wall.

3. In an automatic liquid timing valve of the type comprising a housing, a sleeve member in said housing having a forward end wall, said sleeve member being formed at its rear portion with a valve seat, a plunger rod extending axially in said sleeve member and projecting externally of the housing, a plug element carried by said plunger rod engageable with said valve seat, and spring means biasing said plunger rod toward valve seating position, the improvement comprising an inlet conduit communicating with said valve seat, an outlet conduit communicating with the space rearwardly adjacent said seat, a cup member secured to the forward end of said rod and being slidable within and sealingly engageable within said sleeve member, an adjustable orifice member in said end wall, a suction-responsive check valve provided in said sleeve member forwardly of the cup member, a conduit means connecting said inlet conduit to the space adjacent said check valve, wedge means on the forward end of said cup member, means on said check valve cooperating with said wedge means to open the check valve responsive to a thrust applied thereto by the wedge means as the cup member moves forwardly, and manually operable means carried by said housing and engageable with said check valve for at times moving said check valve to open position.

4. In a timing valve of the type comprising a housing having an inlet and an outlet and including a valve seat therebetween, a plunger carrying a plug engageable on said seat, and spring means urging the plunger toward valve seating position the improvement comprising, a cylinder slidably receiving said plunger, conduit means, including a suction-responsive check valve positioned forwardly of the plunger and connecting said cylinder to said inlet, the forward end wall of said cylinder having a restriction communicating with said conduit means, and cooperating means on said plunger and said check valve for opening the check valve responsive to the approach of the plunger toward said end wall.

ERNEST R. JOYNES.

REFERENCES CITED

The following references are of record in the file of this patent:

UNITED STATES PATENTS

| Number | Name | Date |
| --- | --- | --- |
| 151,933 | Stone | June 9, 1874 |
| 540,346 | Baker | June 4, 1895 |
| 746,324 | Gillin | Dec. 8, 1902 |
| 750,763 | Gillin | Jan. 26, 1904 |
| 1,961,469 | West | June 5, 1934 |
| 2,421,810 | Simpson | June 10, 1947 |